Figure 1:
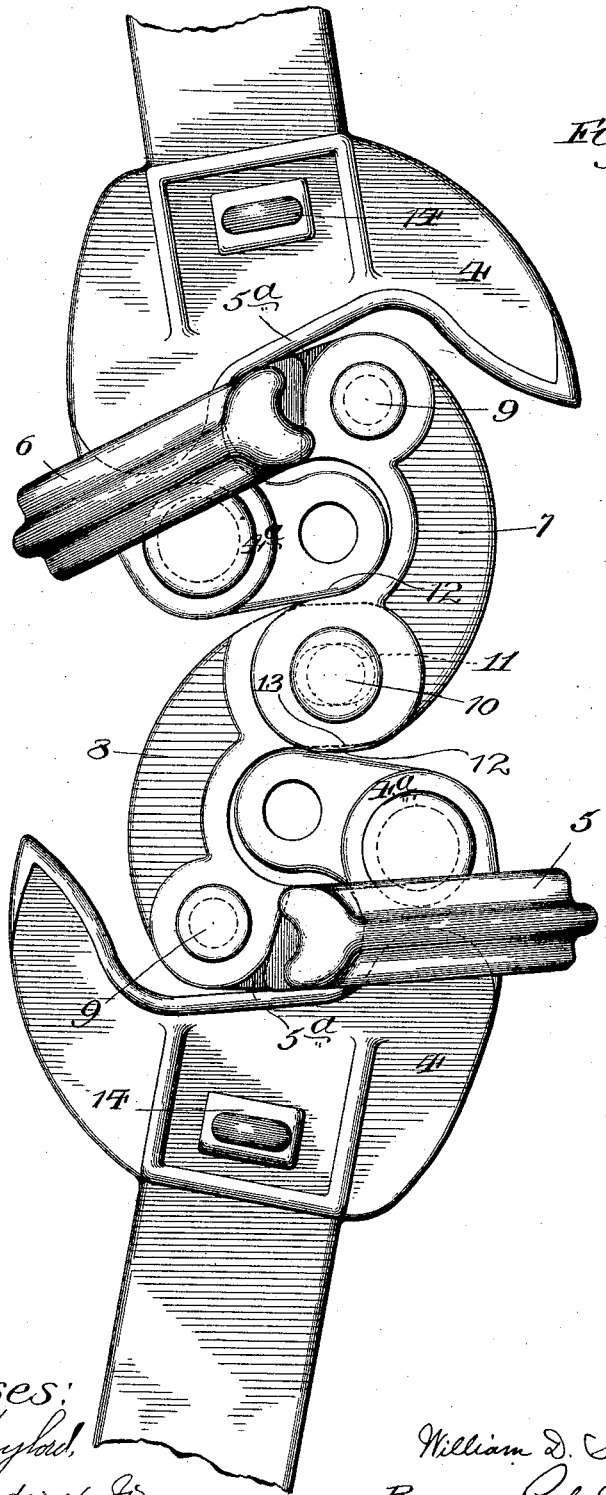

No. 682,644. Patented Sept. 17, 1901.
W. D. SARGENT.
COUPLING DEVICE.
(Application filed June 3, 1901.)
(No Model.) 2 Sheets—Sheet 1.

Witnesses:
Chas. E. Gaylord,
John Enders Jr.

Inventor:
William D. Sargent
By Paul Synnestvedt
Atty

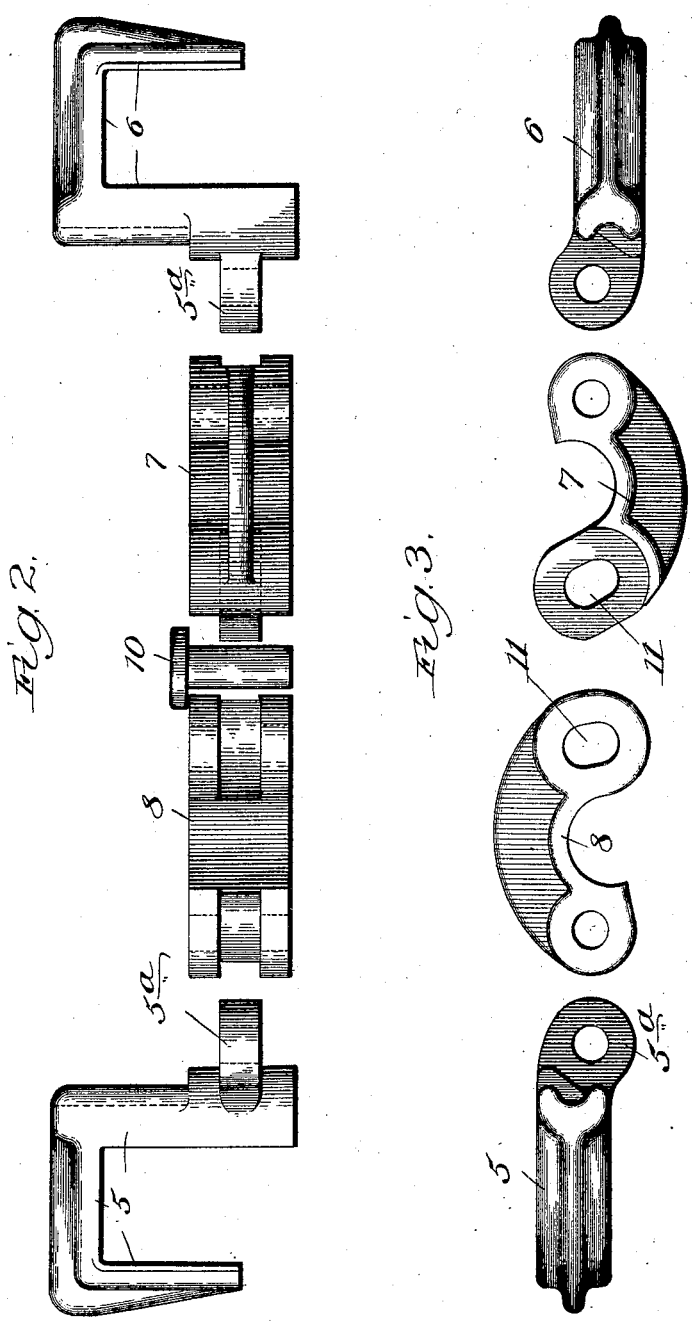

UNITED STATES PATENT OFFICE.

WILLIAM DURHAM SARGENT, OF CHICAGO, ILLINOIS.

COUPLING DEVICE.

SPECIFICATION forming part of Letters Patent No. 682,644, dated September 17, 1901.

Application filed June 3, 1901. Serial No. 62,956. (No model.)

*To all whom it may concern:*

Be it known that I, WILLIAM DURHAM SARGENT, a citizen of the United States of America, residing at Chicago, Cook county, Illinois, have invented certain new and useful Improvements in Coupling Devices, of which the following, taken in connection with the accompanying drawings, is a specification.

This invention has reference to improvements in coupling devices designed to be used for attaching the coupler-heads of two adjacent cars when for some reason or other the two heads will not couple in the usual manner—as, for example, when the car is standing on or is to be moved around a very sharp curve, or when one or the other of the coupler-heads is disabled from some cause, or when from any reason the cars will not couple in the usual manner. The invention is especially designed for use in connection with couplers having knuckle-arms and knuckles such as are used in the standard form of Master Car-Builders' couplers.

In a previous patent I have shown a device of this character in which there are employed two hooks or dogs constructed to engage the knuckle-arms of two adjacent couplers, the said dogs being connected by a chain forming a flexible connection between them. In the practice of my present invention I aim to improve upon the construction shown in the said prior patent, particularly with a view to so arranging the flexible connection between the dogs as to provide for buffing strains as well as pulling strains.

In order that my invention may be better understood, I will now proceed to describe it in connection with the accompanying drawings, in which—

Figure 1 is a plan view of two adjacent coupler-heads with my improved coupling device applied thereto. Fig. 2 shows the several parts which united form the coupling device, and Fig. 3 shows such several parts in plan view.

Referring now more particularly to Fig. 1, it will be seen that embracing the knuckle-arm $4^a$ of the coupler-head 4 I have provided a couple of dogs 5 and 6, somewhat resembling the dogs employed in my prior construction already above referred to. Upon the said dogs are arranged projecting lugs $5^a$ and $6^a$, which are constructed to engage, by means of the pin 9, link members 7 and 8, the said link members being of the crescent shape shown and united together by means of a pin 10 passing through a slotted opening 11 to permit some play between the said members laterally and make it possible to effect the coupling more easily. The link members where they are connected together are arranged so that one engages a slot or bifurcation on the other, and the one which has the slot in it is made larger in the dimension which is longitudinal of the coupling, so that the buffing strain which is transmitted through the knuckles will strike the points marked 12, thus protecting the thinner portion, which comes between the bifurcated end, from being struck by the adjacent knuckles and permitting the insertion of the tongue on the other link even when the knuckles are in contact with the opposite faces of the bifurcated end. The contour-line of the inner portion is shown at 13 in Fig. 1. The peculiar crescent shape given to the two movable or flexible members 7 and 8 is intended to permit the same to pass around the knuckle.

While I have shown the member 7 as formed with a bifurcated end, within which is entered the tongue-shaped end of the member 8, it is obvious that the relation between these two parts might be reversed, if desired, and that the most essential thing with reference to the arrangement of the connection between the parts 7 and 8 is that one portion shall be wider in a direction longitudinal of the coupling to facilitate the insertion of the other at all times, and it is preferable to make the bifurcated end wider, because it is stronger than the narrow tongue formed upon the other link.

At 14 I have shown a couple of locking-pins, such as are ordinarily employed in some of the standard Master Car-Builders' couplers, and I have found by experiment that in case the cars do not come near enough together to permit the coupling to be made exactly as shown in Fig. 1 it can still be effected by lifting the locking-pins and turning the knuckles outwardly, so as to permit the connecting ends of the links to be brought to such position as to insure ready insertion of the pin 10, which joins the two links together, thus obviating the necessity of having the cars spotted exactly the right distance apart. The slotted form of the hole which receives the pin 10 is also a material aid in this operation.

Having thus described my invention, what I claim as new, and desire to secure by Letters Patent, is—

1. A coupling device comprising a pair of dogs constructed to engage the knuckle-arms of a pair of Master Car-Builders' couplers, a link connection pivoted to each of said dogs, and a pivotal connection between said link connections, substantially as described.

2. A coupling device comprising a pair of dogs, a link connection pivoted to each of said dogs, a pivotal connection between said link connections, the connecting end of one of said link connections being made larger in longitudinal dimension than the other so as to take buffing strains, substantially as described.

3. A coupling device comprising a pair of dogs, a link connection secured to each of said dogs, a slotted opening in the meeting ends of said link connections, and a pin engaging said slotted opening, substantially as described.

4. A coupling device comprising a pair of dogs constructed to engage the knuckle-arms of two adjacent Master Car-Builders' couplers, and connections between said dogs constructed to receive both pulling and buffing strains, substantially as described.

In testimony whereof I have hereunto set my hand in the presence of two subscribing witnesses.

WILLIAM DURHAM SARGENT.

In presence of—
PAUL CARPENTER,
H. W. SMALLEY.